US008533090B2

(12) United States Patent
Peterffy (10) Patent No.: US 8,533,090 B2
(45) Date of Patent: Sep. 10, 2013

(54) SECURITY FUTURES CONTRACT WITH SELECTABLE EXPIRATION AND METHOD AND SYSTEM FOR THE CREATION, LISTING, PURCHASE AND SALE, AND TRADING OF THE SAME

(75) Inventor: Thomas Pechy Peterffy, Greenwich, CT (US)

(73) Assignee: Interactive Brokers LLC, Greenwich, CT (US)

( * ) Notice: Subject to any disclaimer, the term of this patent is extended or adjusted under 35 U.S.C. 154(b) by 0 days.

(21) Appl. No.: 12/992,789

(22) PCT Filed: May 15, 2008

(86) PCT No.: PCT/US2008/063767
§ 371 (c)(1),
(2), (4) Date: Nov. 15, 2010

(87) PCT Pub. No.: WO2009/139777
PCT Pub. Date: Nov. 19, 2009

(65) Prior Publication Data
US 2011/0078090 A1    Mar. 31, 2011

(51) Int. Cl.
*G06Q 40/00* (2012.01)
(52) U.S. Cl.
USPC ........................................................ 705/36 R
(58) Field of Classification Search
USPC ........................................................ 705/36 R
See application file for complete search history.

(56) References Cited

U.S. PATENT DOCUMENTS

| 6,014,643 | A | 1/2000 | Minton | |
|---|---|---|---|---|
| 7,318,045 | B2 | 1/2008 | Baecker et al. | |
| 7,778,929 | B2 * | 8/2010 | Corbett | 705/59 |
| 2003/0135441 | A1 * | 7/2003 | Ginsberg | 705/37 |
| 2003/0208407 | A1 * | 11/2003 | Dawson | 705/26 |
| 2005/0119964 | A1 * | 6/2005 | Brady et al. | 705/37 |
| 2006/0129470 | A1 * | 6/2006 | Brendgen | 705/35 |
| 2006/0253369 | A1 * | 11/2006 | O'Callahan | 705/37 |
| 2007/0136180 | A1 * | 6/2007 | Salomon et al. | 705/37 |
| 2007/0208650 | A1 * | 9/2007 | McGill et al. | 705/37 |
| 2009/0254471 | A1 * | 10/2009 | Seidel et al. | 705/37 |

FOREIGN PATENT DOCUMENTS

| EP | 2 157 542 | * | 8/2008 |
|---|---|---|---|
| WO | WO 2004/068384 | * | 8/2004 |

OTHER PUBLICATIONS

Mattos et al.: Use of crops and livestock future contracts in portfolio: an analysis of feasibility, ,Rev. Econ. Sociol. Rural vol. 41 No. 1 Brasilia, Jan./Mar. 2003, pp. 1-12.*
Reed et al.: CBOE announces new electronic system for trading flex options, CBOE, Mar. 17, 2006, Press Release Archive, pp. 1-3.*

(Continued)

*Primary Examiner* — Bijendra K Shrestha
(74) *Attorney, Agent, or Firm* — Stroock & Stroock & Lavan (57) ABSTRACT

The embodiments of the invention provide a novel financial instrument and system and method for creating, listing, purchase and sale, and trading said financial instrument wherein the instrument comprises a security futures contract with a selectable expiration date. A request for quotes process is also provided, which in one embodiment permits the creation and listing of a security futures contract with a selectable expiration date. A method and system for permitting the automated entry of an exchange-for-physicals (EFP) trade including a security futures contract with a selectable expiration date is also provided.

40 Claims, 7 Drawing Sheets

(56) References Cited

OTHER PUBLICATIONS

OMX Nordic Exchange: Tailor made clearing on listed shares and indexes, Apr. 2008, p. 1.*

Australian Securities Exchange: ASX Grain Futures—Exchange for Physical (EFP) Trade, 2008, p. 1.*

International Search Report for corresponding application No. PCT/US08/63767 dated Jan. 19, 2009.

* cited by examiner

High Synth Bid Rev Yield

| Und | Expiry | Bid Size | Bid Price | Ask Price | Ask Size | Div |
|---|---|---|---|---|---|---|
| WM | 20080320 | 500 | 8.200% | 8.750% | 500 | 0.56 |
| CFC | 20080320 | 300 | 5.375% | 5.575% | 300 | 0.15 |
| COF | 20080320 | 150 | 5.150% | 5.700% | 150 | 0.46 |
| DHI | 20080215 | 500 | 5.075% | 5.275% | 500 | 0.15 |
| GOOG | 20071116 | 100 | 5.000% | 5.225% | 100 | 0.00 |
| DHI | 20080320 | 750 | 4.925% | 5.150% | 750 | 0.15 |
| BAC | 20080320 | 500 | 4.825% | 5.050% | 500 | 1.28 |
| RMBS | 20071116 | 200 | 4.775% | 5.000% | 200 | 0.00 |
| CSCO | 20071116 | 2000 | 4.775% | 5.050% | 2000 | 0.00 |
| PTEN | 20071116 | 750 | 4.775% | 4.975% | 750 | 0.00 |
| UTX | 20071116 | 1500 | 4.775% | 5.000% | 1500 | 0.00 |
| QLGC | 20071116 | 236 | 4.775% | 5.175% | 1000 | 0.00 |
| RIMM | 20071221 | 75 | 4.775% | 4.975% | 75 | 0.00 |
| AA | 20071116 | 1000 | 4.750% | 5.100% | 1000 | 0.00 |
| PMCS | 20071116 | 500 | 4.750% | 5.025% | 400 | 0.00 |
| CPB | 20071116 | 1000 | 4.750% | 5.100% | 1000 | 0.00 |
| WLT | 20071116 | 25 | 4.750% | 5.200% | 30 | 0.00 |
| AMAT | 20071116 | 2000 | 4.750% | 4.975% | 2000 | 0.00 |
| UNH | 20071116 | 636 | 4.750% | 4.900% | 750 | 0.00 |
| TWX | 20071116 | 1263 | 4.725% | 4.975% | 2000 | 0.00 |

Low Synth Ask Rev Yield

| Und | Expiry | Bid Size | Bid Price | Ask Price | Ask Size | Div |
|---|---|---|---|---|---|---|
| SRE | 20071221 | 100 | -0.575% | -0.250% | 75 | 0.00 |
| USG | 20071221 | 1500 | -1.725% | 0.750% | 1500 | 0.00 |
| USG | 20071116 | 2500 | -2.250% | 1.325% | 2500 | 0.00 |
| USG | 20080320 | 750 | 0.050% | 1.725% | 750 | 0.00 |
| MAT | 20071221 | 50 | -0.100% | 1.875% | 50 | 0.65 |
| AUY | 20071116 | 400 | 1.850% | 2.125% | 400 | 0.00 |
| NYT | 20071221 | 750 | 0.600% | 2.200% | 750 | 0.23 |
| FHN | 20071116 | 750 | 2.225% | 2.425% | 750 | 0.00 |
| AUY | 20071221 | 200 | 2.425% | 2.625% | 200 | 0.00 |
| COST | 20071221 | 75 | 2.100% | 2.675% | 75 | 0.00 |
| FHN | 20071221 | 400 | 2.575% | 2.750% | 400 | 0.45 |
| CTX | 20071116 | 500 | 3.025% | 3.225% | 500 | 0.00 |
| NYT | 20080320 | 750 | 1.625% | 3.300% | 750 | 0.46 |
| NYT | 20071116 | 5000 | -0.375% | 3.350% | 5000 | 0.00 |
| CTX | 20071221 | 400 | 3.175% | 3.375% | 400 | 0.00 |
| FHN | 20080320 | 250 | 3.200% | 3.425% | 250 | 0.90 |
| DIS | 20071221 | 75 | 3.350% | 3.550% | 75 | 0.31 |
| DRI | 20080320 | 75 | 3.125% | 3.575% | 75 | 0.00 |
| SIRI | 20071221 | 1000 | 3.400% | 3.650% | 1000 | 0.00 |
| AUY | 20080320 | 150 | 3.500% | 3.675% | 150 | 0.01 |

500

SECURITY FUTURES CONTRACT WITH SELECTABLE EXPIRATION AND METHOD AND SYSTEM FOR THE CREATION, LISTING, PURCHASE AND SALE, AND TRADING OF THE SAME

BACKGROUND OF THE INVENTION

1. Field of the Invention

The present invention relates to the field of financial instruments and, in particular, to a security futures contract with a selectable expiration date and the trading, clearing, and settlement of the same.

2. Description of the Related Prior Art

Generally speaking, a futures contract is an agreement to buy or sell a financial instrument, such as a commodity or equity share, at a price fixed on the contract date at some point in the future. Consistent with this general definition, a "security futures" contract is an agreement between two parties to purchase or sell, at a future date, a specified quantity of shares of a single equity security, exchange traded fund, or a narrow-based securities index at a certain price. A buyer's or seller's position in a security futures contract can be eliminated by executing an offsetting transaction for the same security futures contract prior to the contract date, which is often referred to as the delivery or contract expiration date.

In order to eliminate counterparty credit risk, exchange-traded security futures contracts are generally cleared through a clearinghouse, which becomes the central counterparty to both sides of the transaction. For example, in the United States, the Options Clearing Corporation which currently has an AAA credit rating from Standard & Poor's acts as a clearinghouse for security futures contracts.

An example of a specific type of security futures contract presently being traded on an exchange are single stock futures contracts traded on the OneChicago exchange. On the OneChicago exchange, most single stock futures contracts have a total of four expiration dates per active product class. These expiration dates typically include two monthly expirations—for the current and next month—and two forward quarterly expiration dates. For example, a single stock futures contract being traded in January would have expiration dates of February, March, June and September of that same year. The only U.S. exchange currently offering trading in single stock futures contracts is OneChicago, although other exchanges could list and trade the products if they choose.

In order to initiate a trade in single stock futures contracts, the buyer and seller typically must put up a good faith deposit in an interest-bearing margin account with their broker (in the United States, an SEC-registered broker-dealer or a CFTC-registered futures commission merchant). The security deposit ("margin") required is generally 20% of the cash value of the contract.

Single stock futures contracts generally conform to a theoretical pricing model based on the following formula: futures price=stock price×(1+(annualized interest rate/365)×days to expiration)−dividend due before expiration. Single stock futures contracts typically trade at a premium to the cash or "spot" value of the underlying security because they contain an interest rate carry component. The premium reflects the carrying costs of owning the underlying security from trade day to expiration. Since the holders of single stock futures are not entitled to collect dividends, the price is discounted by the amount of any expected dividend due prior to expiration.

Investors may combine a transaction in a security futures contract with a simultaneous transaction in the underlying security (together called an "Exchange for Physicals" or "EFP" trade). An EFP trade allows the swap of a long or short security position for a security futures contract. There are several reasons why an investor would enter into an EFP trade. One reason is to earn a higher return on cash balances in the investor's brokerage account. The investor could buy a stock and sell a single stock futures contract at a premium higher than the interest that is generated on the cash balance in the investor's brokerage account. By way of example, an investor with a margin account at a broker may use available funds for which he or she wishes to receive an interest rate return to purchase a security (e.g., 1000 shares of IBM stock). To effect an EFP trade, the investor will then sell single stock futures contracts covering the same number of IBM shares. Because single stock futures contracts typically trade in multiples of 100 shares per contract, the investor, in this example, would sell 10 IBM contracts. After these two offsetting transactions comprising the EFP trade are made, the investor is "delta neutral," i.e., he or she has no exposure to the price movement of the underlying security and, thus, is indifferent to whether the price of IBM stock rises or falls. On the one hand, if IBM's stock price rises, the investor will profit on the long stock position, but lose an equal amount on the short single stock futures position. On the other hand, if IBM's stock falls, the investor will lose value on the long stock position, but gain value in an equal amount on the short single stock futures position.

The objective of the EFP trade is not to profit by the change in price of the underlying security, but rather to receive a return on the funds invested in the EFP trade via the premium the investor receives from the sale of the security futures contract. As noted above, the security futures contract that was sold by the investor trades at a premium to the underlying security that was bought by the investor. Thus the investor will receive somewhat more for his sale of the security futures contract than the cost of his/her purchase of the underlying security, representing implied interest on the funds that are invested in the transaction. The absolute amount of the interest depends on the premium that was implied in the security futures contract, which in turn depends on market interest rates plus the length of time until expiration of the futures contract.

The EFP trade illustrated above represents a way for the investor to lend his/her available cash to the market at an interest rate return that will typically be more favorable to the investor than the rate of return the investor would be paid for cash balances in his brokerage account. In addition, since security futures contracts are settled through the Options Clearing Corporation, an AAA rated entity, earning interest by means of an EFP trade is safer than many other interest earning alternatives. Essentially, the EFP trade allows an investor to make a fixed-duration loan (i.e., the investor is financing somebody else's position on a fully secured basis), at a fixed rate of return to the market in order to get a better interest rate return on free cash. The "loan" expires upon expiration of the security futures contract (when the short futures contract expires, the long stock in the investor's account is sold and the investor receives his/her cash back).

However, the current, fixed expiration cycle for security futures contracts, i.e., the four available expiration dates, significantly limits the usefulness of the EFP trade as a vehicle for lending free funds to the market, because the term of the loan is limited to the time between the initiation date of the transaction and one of the four available expiration dates. This is because to maximize the rate of return on the EFP trade the trade must be held until expiration of the security futures contract. Unwinding the EFP trade prior to the expiration date (e.g., by buying back the futures contract and selling the security) exposes the investor to various market conditions, including but not limited to interest rate fluctuations. Moreover, by unwinding the EFP trade prior to the expiration date of the selected security futures contract, the investor will likely not realize the full implied interest rate of return of the initial EFP trade, because the premium implied in the security futures contract may have changed based on the fluctuation of interest rates which will be reflected in the price that the investor pays to buy the security futures contract in order to cover that side of the trade. Thus, unwinding the EFP trade early is typically not a way for an investor to tailor the duration of the "loan" of his/her funds to the market, because the implied interest rate the investor receives will not be locked in. The better way to lock in a given rate of return is to hold the short security futures position until it expires. Thus, it would be much more useful if the investor or other counterparty to the trade could select the expiration date for the security futures contract. If this were the case, then the investor or other counterparty could enter the EFP trade on any business day and could tailor the expiration of the transaction to the exact date on which the investor wishes for the "loan" to expire and to have his/her funds paid back. This would allow the investor to loan out his free cash via an EFP trade for 1 day, 2 days, 3 days, 81 days, etc., depending on his/her specific cash flow and investment needs.

Consequently, there is a long felt, but unresolved need, in the art for a security futures contract that could be traded either as a standalone financial instrument or in connection with an EFP trade that permits the selection of an expiration date for the security futures contract.

SUMMARY OF THE EMBODIMENTS OF THE INVENTIONS

The present invention in its various embodiments overcomes shortcomings in the prior art. Embodiments of the inventions are generally related to a security futures contract with a selectable expiration date and other financial instruments based thereon. It will be understood that although the terms "security futures contract" and "single stock futures contract" are used throughout this description, the present invention applies to all types of futures contracts, such as bond futures and other futures products related to commodities, securities or indexes of securities. It will also be understood that the expiration date associated with the security futures contract may be selected by any counterparty to a trade involving a security futures contract. As such, references to an "investor-selected expiration date" or similar terms are provided for example only and in no way intended to limit the scope of the invention as disclosed and claimed in this application.

The embodiments of the invention, therefore, provide a novel financial instrument comprising a security futures contract with a selectable expiration date and a method and system for permitting the creation, listing, trading, purchase and sale of a security futures contract with a selectable expiration date. A request for quotes process is also provided, which in one embodiment permits the creation and listing of a security futures contract with a selectable expiration date. A method and system for permitting the automated entry of an EFP trade including a security futures contract with a selectable expiration date is also provided.

In one embodiment of the invention, a computer implemented method of creating and listing a security futures contract comprises: receiving a request message from the first counterparty computer at the second counterparty computer to create the security futures contract, the request message including a first indication of an underlying security for which the security futures contract will be associated, and a second indication of a selected expiration date for the security futures contract, wherein the selected expiration date is different than available expiration dates for other security futures contracts related to the underlying security as listed on a futures trading exchange; transmitting a quote message from the second counterparty computer to the first counterparty computer including at least a price quote for the security futures contract based on the first and second indications in the request message; receiving an acceptance message from the first counterparty computer at the second counterparty computer indicating acceptance of the price quote; and facilitating creation of the security futures contract whereby the security futures contract based on the underlying security has an expiration date equal to the selected expiration date.

In another embodiment of the invention, a method of receiving a request to execute an exchange for physicals trade including a security futures contract with a selected expiration date; and facilitating execution of a transaction whereby the security futures contract having the selected expiration date is exchanged for the corresponding underlying security.

In another embodiment of the invention, a computer implemented method of executing an exchange for physicals trade, wherein the futures contract includes an expiration date that is selectable and different than available expiration dates for other futures contracts related to the underlying asset listed on a futures trading exchange.

In yet another embodiment, a system for creating a security futures contract comprises: a computer system capable of communication with a network and operative with creation programming to display graphical user interfaces, the graphical user interfaces including input fields enabling entry of information relating to the security futures contract; receive a first selection for an underlying security to be bought or sold at a future date; receive a second selection for a contract amount; receive a third selection for an expiration date selected by an investor; request a quote for the security futures contract based on the first, second, and third selections; receive at least one quote for the security futures contract; receive an acceptance message; and facilitate creation of the security futures contract based on the first, second, and third selections and using the quote. Additional features may include, but are not limited to, the system being further programmed to: (a) calculate and display the implied rate of return for an exchange for physicals trade related to the security futures contract; (b) receive investor-selected criteria for an exchange for physicals trade, search and display matching exchange for physicals trades (calculate and display the implied rate of return for the matching exchange for physicals trades).

In yet another embodiment, a system for dynamically displaying a set of exchange for physicals trades based on investor-selected criteria, which may include expiration date, available cash, or underlying symbol. An additional feature may include a screen function where the display system would automatically identify EFP trades that would generate the highest rate of return or lowest rate of return.

Although many of the embodiments described herein are discussed in the context of an exchange system, it will be understood that the various features of such embodiments need not be operative on an exchange system and may exist as standalone systems. In particular, embodiments referring to the creation, request for quote, searching for and display of available security futures contracts and/or exchange for physicals trades may all be operative on systems designed to operate alone or in combination with an exchange system.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE FIGURES

Embodiments of the invention will be described and shown in detail by way of example with reference to the accompanying drawings in which.

DETAILED DESCRIPTION OF THE EMBODIMENTS

In accordance with various embodiments of the invention, and as shown in the FIGS., various systems and methods to create a novel security futures contract are disclosed wherein the security futures contract has a selectable expiration date. As will be seen, the security futures contract disclosed herein may be advantageously included in an exchange for physicals trade the length of which is determined by the selectable expiration date. Various systems and methods for creating, listing, pricing, and trading the security futures contract and related EFP trades are disclosed.

In an embodiment, a computer implemented method of creating a futures contract for trading on a futures trading exchange, comprises: a standardized set of specifications including at least an underlying asset and a number of units for the underlying asset for each futures contract; and a delivery date that is selectable and different than currently available delivery dates for other futures contracts related to the underlying asset listed on the futures trading exchange. The underlying asset may be a security or a commodity or any other type of financial instrument. Types of securities that may be applied to the invention include but are not limited to stocks, bonds, funds, and options. Types of commodities that may be applied to the invention include but are not limited to west texas intermediate crude, light, sweet crude, brent crude, natural gas, heating oil, gulf coast gasoline, propane, uranium, wheat, corn, soybeans, oats, rice, cocoa, coffee, cotton, sugar, hogs, pork bellies, cattle, gold, platinum, palladium, silver, copper, lead, zinc, tin, aluminum, nickel, steel, ethanol, and rubber.

Figure 1:
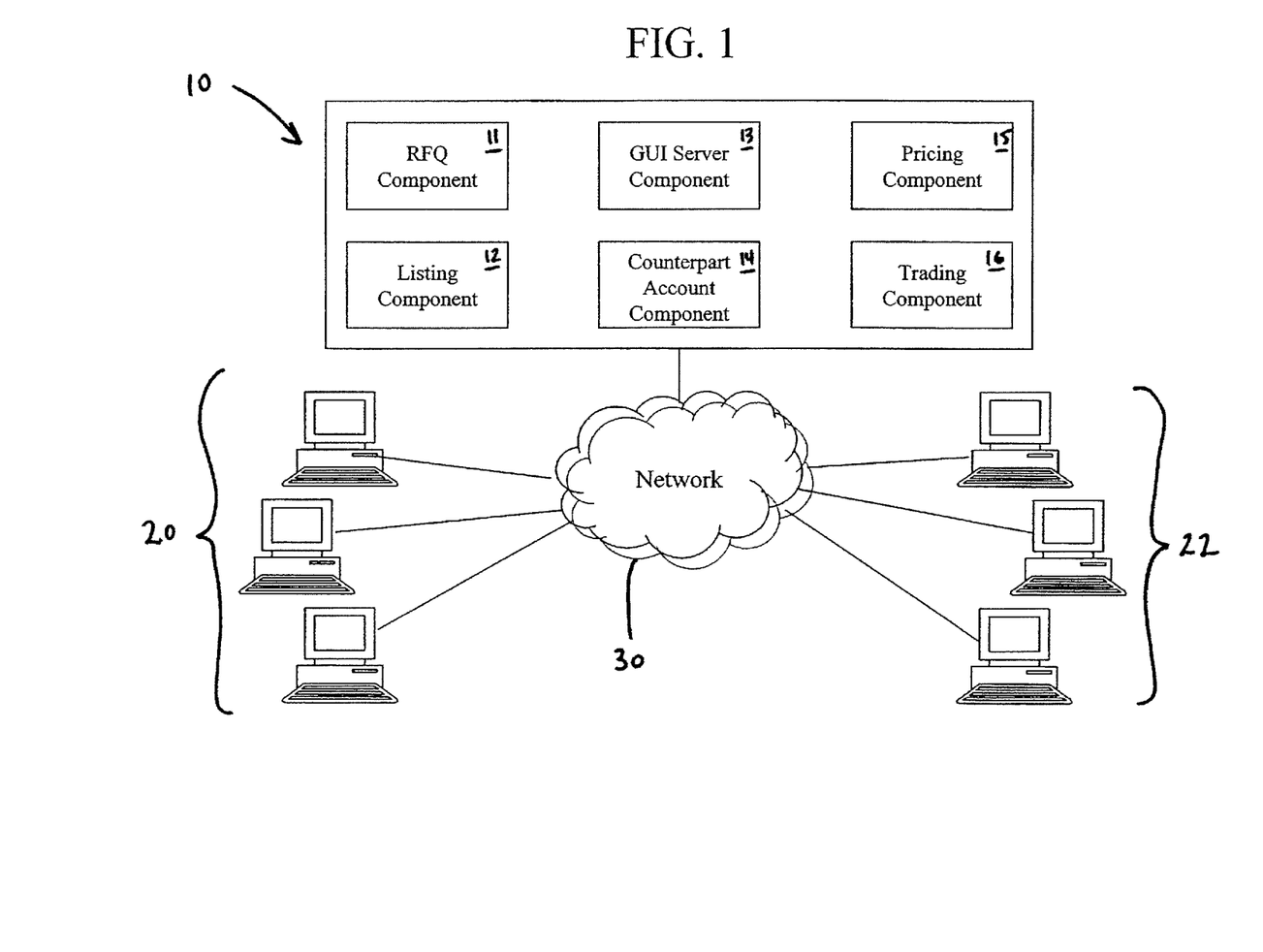
FIG. 1 is a schematic diagram of an embodiment of a system in accordance with the present invention.

With reference to FIG. 1, there is shown an embodiment of a system 10, which may be an exchange system of a futures exchange, such as the OneChicago or Chicago Mercantile Exchange (CME) or other similar exchange, which provides functionality for creating, listing, pricing and trading a security futures contract with a selectable expiration date. It will be understood that the system or components of the system (including RFQ component 11) set forth in FIG. 1 may be operated or performed by an entity other than an exchange (i.e., broker-dealer or other financial institution). It will also be understood that in the context of the present invention, the term "investor" generally refers to a person or entity that desires to create a security futures contract with a selectable expiration date and may include retail and individual investors, institutional investors, banks, market-makers, broker-dealers, or other entities. Persons of skill in the art will recognize that there may be more than one counterparty for each leg of an EFP trade, which each may be executed on different exchanges. For example, the equities kg of the transaction may be executed on NYSE Euronext and the futures leg of the transaction on a futures exchange.

It should also be recognized that the computer systems described herein generally include one or more computers that are programmatically structured, as detailed below; to perform the functions required to manage the creation and operation of the financial product of the present invention. One skilled in the art will recognize that the computer systems may as a matter of design choice include any number and configurations of discrete computers and databases, which may be used separately or in tandem to support the traffic and processing needs necessary in operation at one time. In one embodiment, the computer systems, if multiple computers are used, are configured using a round-robin configuration to handle end user traffic. Although not depicted in the figures, the one or more computers of the computer systems generally include such art recognized components as are ordinarily found in such computer systems, including but not limited to processors, RAM, ROM, clocks, hardware drivers, associated storage, and the like.

Furthermore, each of the computer systems described herein preferably includes a network connection. The network connection may be a gateway interface to the Internet or any other communications network through which the systems can communicate with other systems and user devices. Network connection may connect to the communications network through use of a conventional modem (at any known or later developed baud rate), an open line connection (e.g., digital subscriber lines or cable connections), satellite receivers/transmitters, wireless communication receivers/transmitters, or any other network connection device as known in the art now or in the future.

As shown in FIG. 1, system 10 includes one or more computer systems programmatically structured to effectuate the creation, and in some instances, the listing, and trading of security futures contracts with selectable expirations and other related functions typically performed by futures exchanges. One or more of the computer systems comprising system 10 is capable of communication with one or more counterpart computers 20, 22 through a network 30. It is preferred that the communication connection between system 10 and counterpart computers 20, 22 be a secure connection when financially sensitive information or data is being transmitted, as will be described in further detail. It will be understood that by the term "connection" or "communication connection" it is not intended that the various computers be in constant connection or communication, but rather be capable of communication upon establishment of a connection. For example, a counterpart computer 20, 22 may from time-to-time "connect" to system 10 using an unsecured Internet connection to check market prices or related information. In another example, a secure connection may be established between counterpart computer 20, 22 and system 10 in order to exchange sensitive financial data, such as trading data or data for creating the security futures contract or EFPs described herein. Counterpart computers 20, 22, as shown in FIG. 1, may include the computer systems of an investor and one or more counterparts. Again, in the context of FIG. 1, the architecture of system 10 is being shown and described in the context of an exchange system, but alternatively the counterpart computers 20 and 22 may be in direct communication and the functionality described herein may be distributed among counterpart computers 20 and 22 or on one such computer.

In embodiments where system 10 is an exchange system, system 10 may be configured as any type of trading system, including but not limited to, a crossing network in which orders and related messages are routed between counterparties and not broadcast to other members of the exchange, or more traditional electronic communication networks (ECNs) or other alternative trading systems (ATS).

Figure 2A:
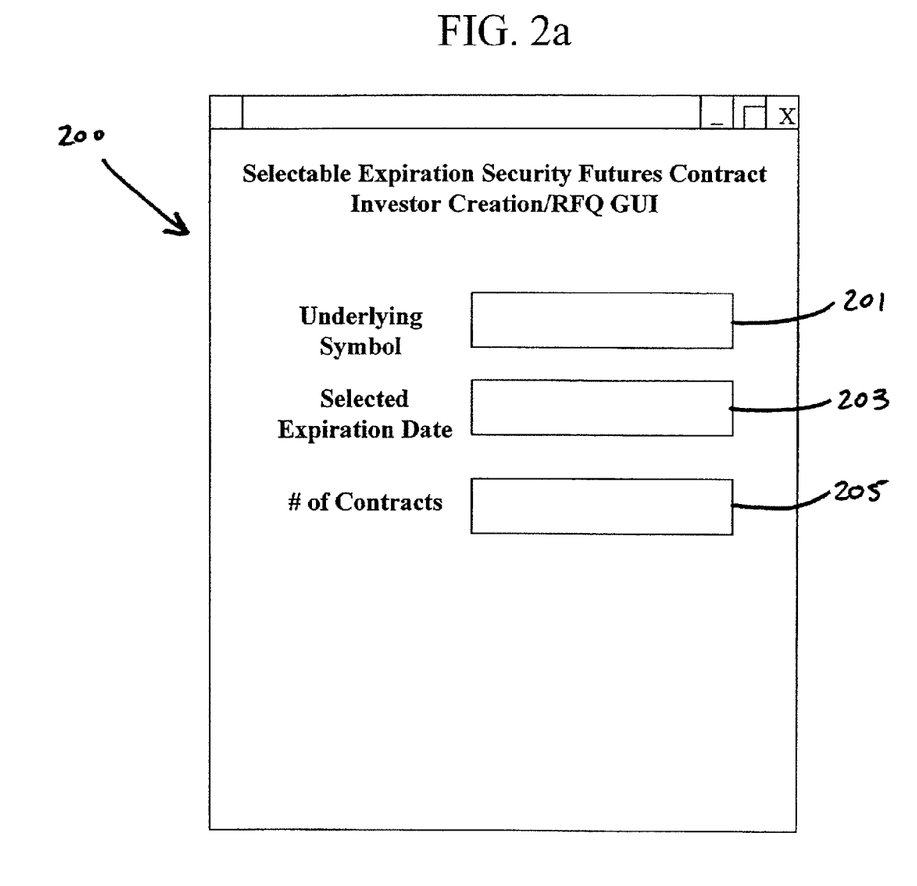
FIG. 2A is an embodiment of a graphical user interface for inputting information relating to the listing and/or creation of a security futures contract with a selectable expiration date in accordance with the present invention.
Figure 2B:
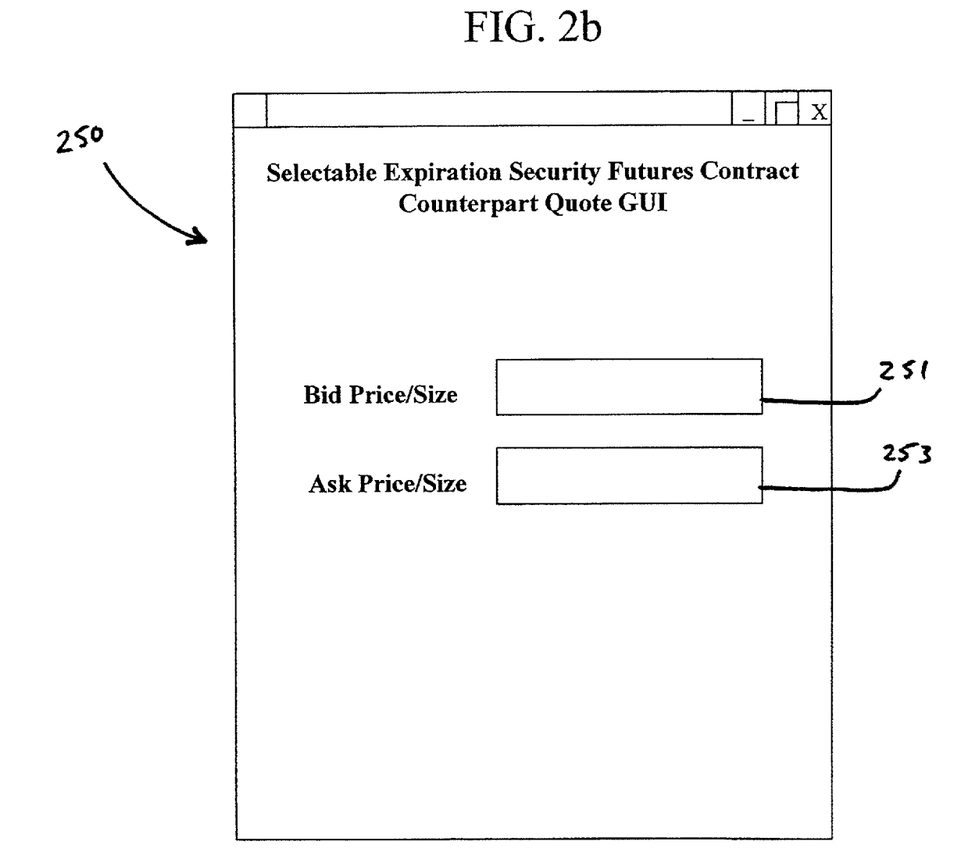
FIG. 2B is an embodiment of a graphical user interface for inputting information relating to the pricing of a security futures contract with a selectable expiration date in accordance with the present invention.

System 10 is preferably programmed to provide a number of graphical user interfaces (GUIs) to investors such that investors can interact with and use the functions provided, by system 10. These GUIs may include pricing tables, charts, market data and other information permitting an investor to view the market for various futures contracts and other financial instruments. System 10 also preferably includes the capability to serve one or more GUIs for permitting the creation (and request for quote) of a security futures contract including a selectable expiration date to counterpart computers 20, 22. An example of one such GUI 200 is shown in FIG. 2a. FIG. 2a depicts a number of input fields 201 (underlying symbol), 203 (selected expiration date), and 205 (# of contracts), that may be used for inputting information relating to the creation (and request for quote) of a security futures contract including a selectable expiration date that is different than available expiration dates for other security futures contracts related to the underlying security as listed on a futures trading exchange. By inputting data into the GUI 200, information related to the creation of a security futures contract including a selectable expiration date can be efficiently transmitted to system 10 and then transmitted to one or more counterparties to request a quote. Using the information entered by an investor into GUI 200, for example, a counterparty can generate a quote for the requested security futures contract with a selectable expiration date. Information related to the quote may be input into a GUI 250, such as is shown in FIG. 2b. GUI 250 preferably includes a bid and/or ask price and size (251 and 253), for inputting information relating to the pricing of a security futures contract with a selectable expiration date by a counterparty.

With reference back to FIG. 1, system 10 generally includes one or more program modules or components for operating the functions described herein. Thus, the system 10 generally includes an RFQ component 11 for operating the request-for-quotes function shown and described in FIG. 3; in the case of exchange systems, a listing component 12 for listing one or more security futures contracts with a selectable expiration date on the exchange; a GUI server component 13 for serving one or more GUIs to investors and counterparties; and an account component 14 for storing and administering investor and counterparty accounts. The system 10 may also include other modules or components, such as a pricing component 15 for tracking and displaying pricing of various future contracts listed on an exchange; and a trading component 16 for permitting the execution of trades on an exchange system.

System 10 is preferably structured as a web-server based system wherein user access to the system 10 is achieved through an Internet or like connection. It will be understood that connection to the system 10 may also be accomplished via a point-to-point connection or other type of direct connection. Investors and counterparties may connect to the network 30 through any variety of ISP providers if system 10 is structured to be connected with through an Internet connection, such as but not limited to a cable, satellite or fiber optic broadband connection, a dial-up connection, or other form or wired or wireless connection. In the preferred embodiment where communication with system 10 is accomplished through a web connection, GUI server component 13 is preferably structured to operate as in a server-client architecture using a thin-client where GUI server component 13 serves various GUIs and information to users via the network 30. In the alternative, system 10, and thus GUI server component 13, could utilize a fat-client or simply server data or other information to investor and counterparty computers 20, 22 for display using software loaded and operative on the investor and counterparty computers 20, 22. It will be understood by those in art that the display of user interfaces and the provision or display of information to a user may be accomplished within the scope of the present invention in a number of ways, including, but not limited to, the serving or pushing of interfaces to a user, exposing one or more application programming interfaces (AFIs) to the counterparty computers, and the local storing and/or generation of interfaces at a counterparty computer upon a trigger received from the server system. In the above-referenced embodiments, the various computer systems involved preferably communicate using a messaging system in which information be communicated is contained within one or more messages, which may be packetized, encrypted or formatted, as necessary to address specific bandwidth or security concerns. The message may use XML or other message types and may be based off of one or more message standards such as FIX in the financial industry.

Account component 14 may be structured as a relational database storing information and data concerning users (e.g., investors, brokers, and other counterparties) of the system 10. Account component 14 may be an integral part of system 10 or a separate database system including one or more computers and data storage devices. The data storage devices may include hard disks (e.g., in a RAID configuration), tape drives, flash memories, other optical disk memories, and the like. The information stored by account component 14 may include, but is not limited to, user name (whether an individual or entity), user identifier, user address and contact information, credit and margin information, and trade history information.

Figure 2C:
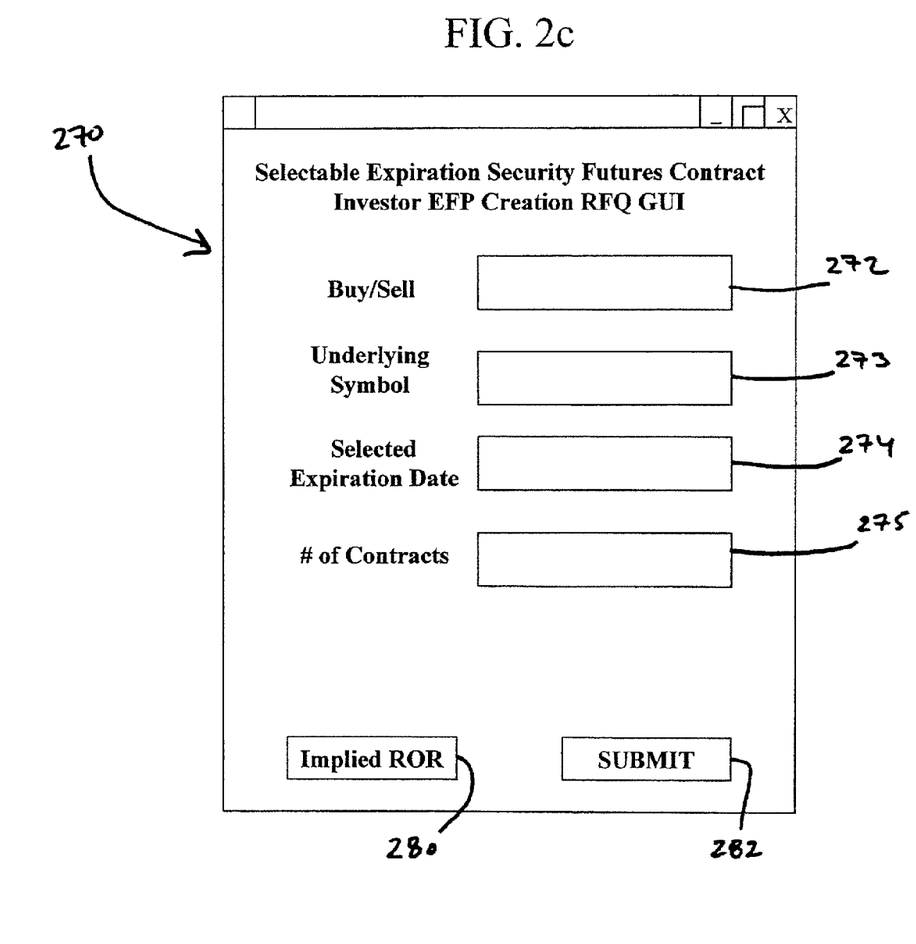
FIG. 2C is an embodiment of a graphical user interface for permitting the investor/user to input information related to the listing and/or creation of an EFP trade in accordance with the present invention.

By way of example, in an embodiment, system 10 may include a pricing component 15 that provides functionality to display the implied rate of return for one or more EFP trades depending on the underlying security and the selected expiration date of the security futures contract. As noted, it will be understood that pricing component 15 need not be operative on system 10 and may operate on a standalone system configured in relevant part like system 10. FIG. 2c depicts a GUI 270 that contains a number of input fields 272 (buy/sell indication), 273 (underlying symbol), 274 (selected expiration date), and 275 (# of contracts), for permitting the investor/ user to input information related to the creation of an EFP trade, including but not limited to a buy or sell indication, underlying symbol, selected expiration date of the security futures contract, and contract amount. It should be understood, however, that in some embodiments, the investor need only enter a dollar amount and/or expiration date to create or request a quote on an EFP trade.

GUI 270 also preferably includes a means for submitting the EFP trade information to system 10. In the example shown in FIG. 2c, GUI 270 includes a pair of graphical buttons 280, 282. Graphical buttons 280, 282 may be selected using a mouse pointer, touchpad, light pen or other graphical pointer device. A first button 280 provides the option for the EFP trade information to be submitted to the system 10 for the purpose of calculating the implied rate of return of the proposed EFP trade and optionally comparing the implied rate of return to the rate of return that the investor would receive from his/her broker on the same free funds if not used in an EFP trade. A second button 282 provides the option for the investor to submit the EFP trade details to the system 10 for direct posting in the RFQ process described herein. If the investor chooses to first see the implied rate of return using button 280, the investor would preferably be given the opportunity to modify the EFP trade details, cancel the proposed transaction, or submit the transaction details to the RFQ process as is.

In an alternate embodiment, GUI 270 may also be designed, and system 10 programmed, to calculate the implied rate of return and display the same on GUI 270 dynamically as EFP trade data is input in fields 272-275, without further action by the investor. The comparison to free funds rates of return can also be provided dynamically.

Figure 4:
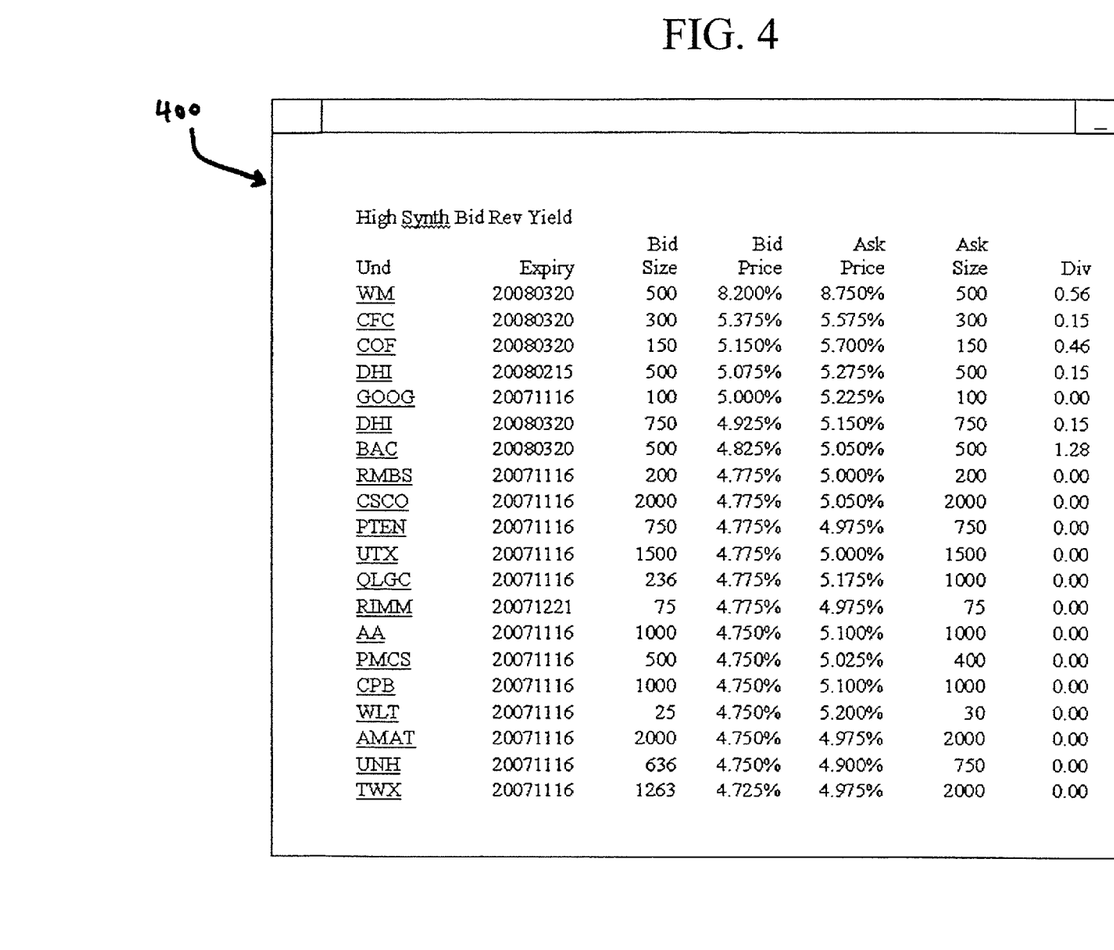
FIG. 4 is a depiction of a screen showing a listing of EFPs from highest to lowest return in accordance with an embodiment of the present invention.
Figure 5:
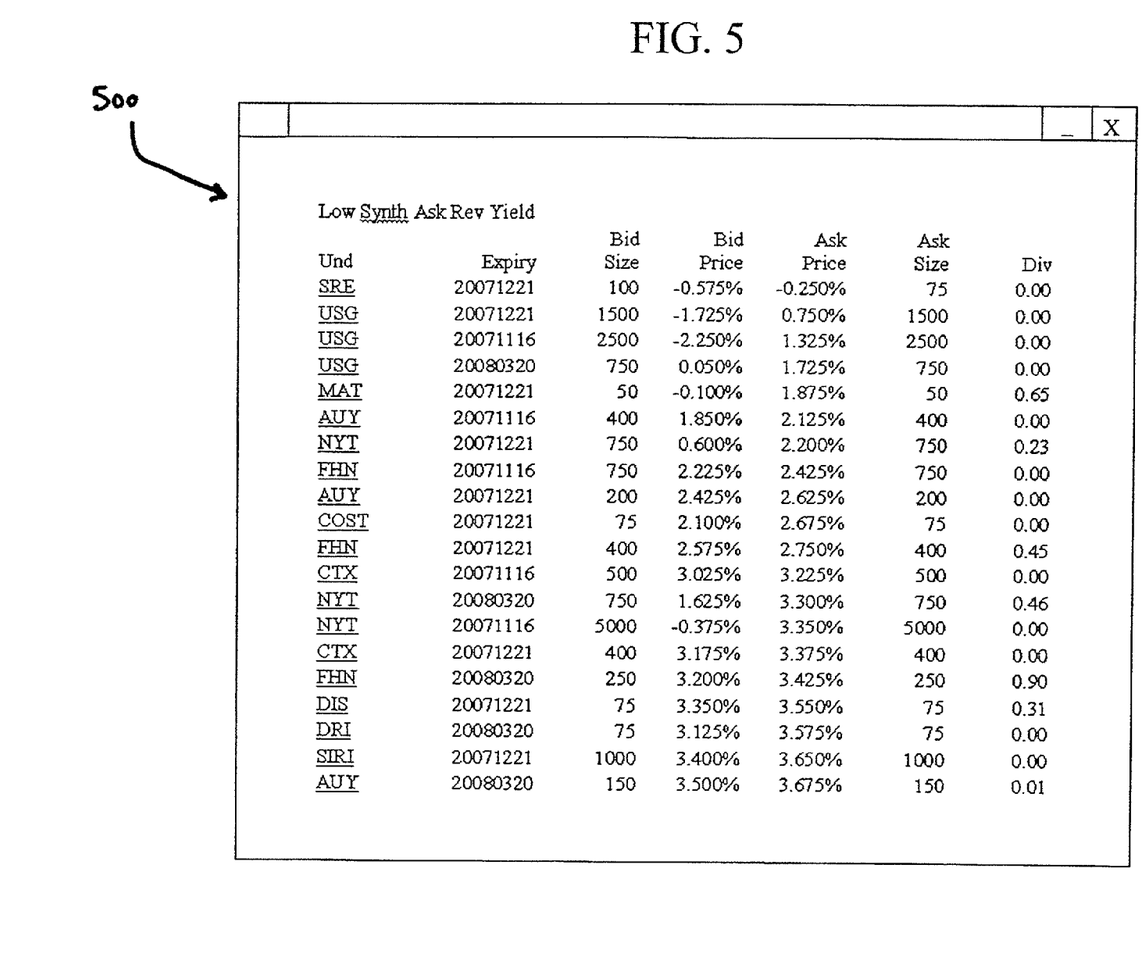
FIG. 5 is a depiction of a screen showing a listing of EFPs from lowest to highest return in accordance with an embodiment of the present invention.

In yet another alternate embodiment, system 10 may be programmed to provide a function to automatically search and identify EFP trades according to investor-selected criteria or to select EFP trades which would generate the greatest rate of return as a result of current premiums in the marketplace between the security futures contract and the underlying security (or lowest rates available for those investors that desire to borrow). Again, the functionality described herein need not be operative on system 10 and may operate on a standalone system configured in relevant part like system 10. In such an embodiment, exchange system 10, and in particular pricing component 15, would programmatically function to receive investor-selected criteria, which in some instances may include an investor-selected expiration date, and search current pricing data for the available security futures contracts to find matches. Once matches are found, the pricing component 15 would be programmed to calculate the implied rate of return for an EFP trade using prices for the matching security futures contracts and the corresponding underlying securities in conjunction with the investor-selected criteria. Alternatively, in the absence of investor-selected criteria, the pricing component 15 could be programmed to search for and calculate the highest rates of return available (or lowest rates available for those investors that desire to borrow). This information would preferably be displayed to investors and counterparts alike upon request or on various GUIs, such as those shown in FIGS. 4 and 5, provided by system 10. For instance, as in GUI 400 of FIG. 4, a portion of the various GUIs provided by system 10 could be dedicated to displaying the top ten EFP trades by rate of return at any given or defined time interval. Alternatively, as in GUI 500 of FIG. 5, system 10 can be configured to search for and display EFP trades by lowest to highest rate of return.

By way of non-limiting example, system 10 could be structured to analyze an investor's cash and/or security holdings and perform a search for current pricing data for the available security futures contracts to find potential EFP trade matches. System 10 could further be programmed to analyze the available security futures contracts in conjunction with the investor's cash and/or security holdings to recommend an investor-selected expiration date for a security futures contract to be used in an EFP trade that would increase or maximize the implied interest rate that the investor would realize by performing the proposed EFP trade. Such recommendations are based in part of the current interest rate market and prices for the underlying security and related security futures contracts listed on an exchange.

Figure 3:
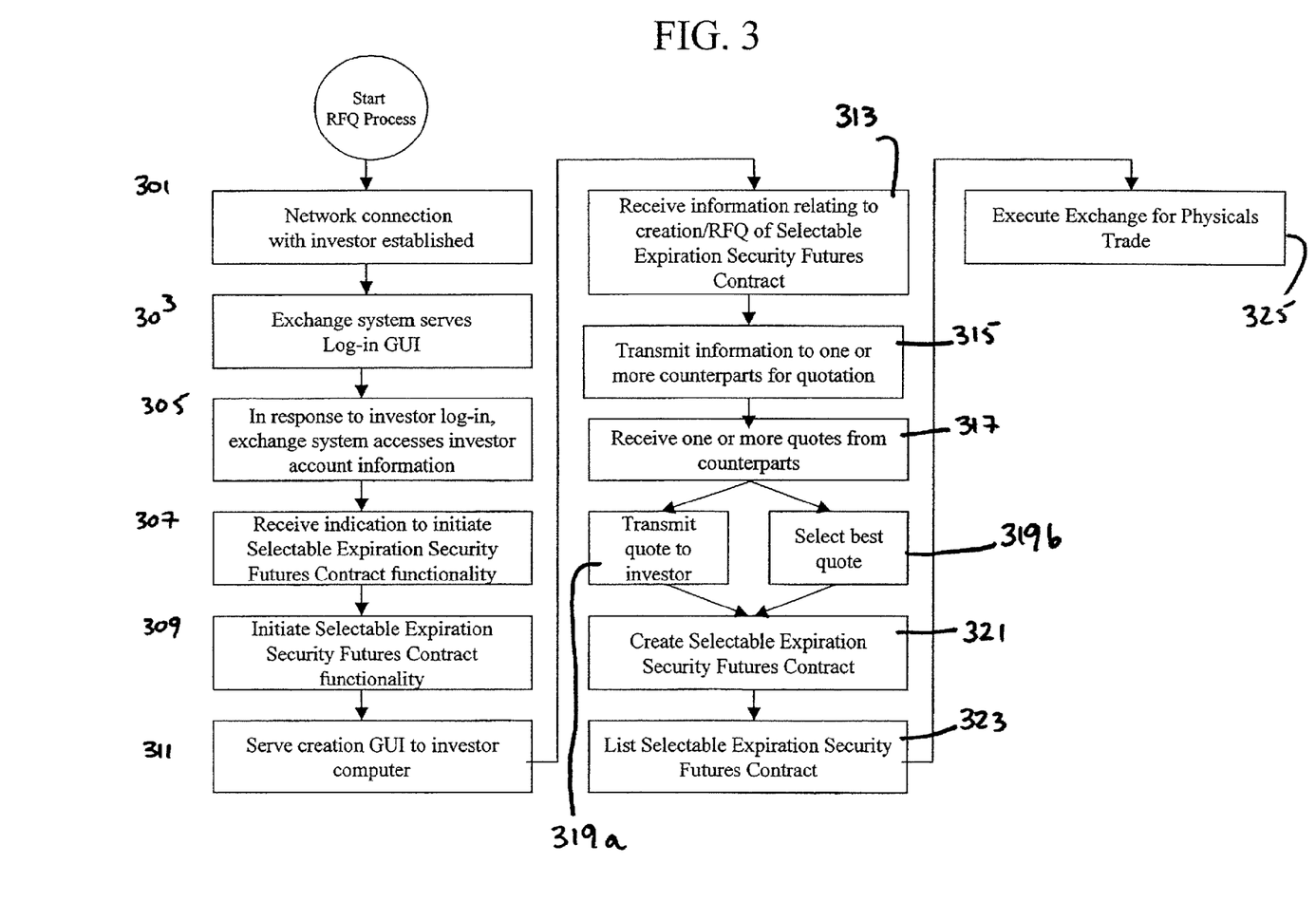
FIG. 3 is a flow diagram of an embodiment of a method of creating a security futures contract with a selectable expiration date and related EFP trade in accordance with an embodiment of the present invention.

With reference now to FIG. 3, there is shown an embodiment of a method of using a request for quote process to create a security futures contract including a selectable expiration date. In one embodiment, the security futures contract is created by using the following process: (a) the investor and/or the investor's broker selects an expiration date (or dates) that is consistent with his/her needs and an underlying security; (b) the investor (or a broker on behalf of the investor) sends a request for quotes (RFQ) to the exchange for a contract identifying at least the selected underlying and the selected expiration date or dates; (c) the exchange issues the RFQ to its members (counterparts or market maker members); (d) the exchange receives one or more quotes in response to the RFQ, and (e) the exchange lists a security futures contract expiring on the date or dates selected by the investor based on the quotes received. In the alternative, the investor may specify only the expiration date or dates and not the underlying security. The counterparts and/or market makers would respond with quotes based on one or more underlying securities.

In this way, an investor can seek quotes on customized security futures contracts with investor-selected expiration dates so as to realize a higher rate of return on cash balances in the investor's account. The RFQ process described herein enables an investor to customize an EFP trade strategy for a selected period of time, not tied to exchange designated expirations, and to receive quotes on the security futures contracts with select expiration dates. As such, in embodiments where the investor selects expiration, the investor advantageously gains the flexibility of customizing expiration dates, while realizing the benefit of increased rates of return through EFP trades.

In yet another embodiment, in lieu of the RFQ process described above, security futures contracts could be created and listed on an exchange wherein the security futures contracts having a daily, weekly, bi-weekly, or monthly expiration dates. Furthermore, it would be advantageous to establish a finer tick increment (for example, $1/100$ penny or 1 cent per contract) to allow EFP transactions to more accurately reflect the implied interest rate in the premium between the security futures contract and underlying security. Presently, most exchanges use a tick size of one (1) penny (or $1.00 per contract since each contract covers 100 shares).

With specific reference to FIG. 3, a preferred method of using an RFQ process to create a security futures contract with a selectable expiration date that can be incorporated into an EFP trade is described. In step 301, an investor establishes a network connection to the RFQ system, which may be a part of the system 10. In step 303, the RFQ system provides one or more GUIs permitting an investor to select or log into the investor's account with the exchange system. In step 305, in response to information received from the investor, the exchange system accesses information in the investor's account. In step 307, the RFQ system receives a selection from the investor to initiate the "Create A Security Futures Contract with a selectable expiration date" functionality. At this point, in step 309, the "Create A Security Futures Contract with a selectable expiration date" functionality is initiated. In step 311, the RFQ system transmits or serves a GUI to investor computer 20 in which information related to the security futures contract with a selectable expiration date may be entered, such as is shown in FIG. 2a. In step 313, the RFQ system receives information related to the security futures contract with a selectable expiration date, including but not limited to an underlying symbol or other identifier, a number of shares/contracts and expiration date. In step 315, the RFQ system transmits information related to the security futures contract with a selectable expiration date to one or more counterpart computers 22. In step 317, the RFQ system receives information relating to a price quote on the security futures contract with a selectable expiration date from the one or more counterpart computers 22, which preferably includes, but is not limited to, a bid and/or ask price and size, as is shown in FIG. 2b. In step 319a, the RFQ system may either transmit the price quote to the investor for approval, or in an alternate embodiment, as in step 319b, select the best price quote received. Once a price quote is selected, in step 321, the security futures contract with a selectable expiration date can be created using the information received by the exchange system 10. In step 323, the security futures contract with a selectable expiration date may be listed on the exchange.

With further reference to Step 325 of FIG. 3, upon listing of the security futures contract with a selectable expiration date on the exchange through the use of RFQ system, an EFP trade can be executed on the system 10. It will be understood that the benefit of having the security futures contract with a selectable expiration date listed on an exchange is that trades involving such security futures contract will be cleared by a central clearinghouse thereby removing the counterparty risk that would otherwise be present if the trade were performed over-the-counter using a security forward contract. An EFP trade in accordance with an embodiment of the present invention includes a trade between two counterparties of a security and a security futures contract with a selectable expiration date for a given period of time. It is preferred that the transaction be maintained (i.e., the security and security futures contract with a selectable expiration date both held by an investor) until the selected expiration date, Alternatively, the process for creating a security futures contract may operate in a substantially reverse order. Specifically, in an alternate embodiment, the system can be programmed and configured to generate one or more security futures contracts having a myriad of expiration dates different from the available expirations dates for other security futures contracts related to the underlying security listed on a futures trading exchange. The list of system-created security futures contracts may then be graphically displayed or accessed by an investor/user. The system will also provide functionality to enable the investor to select one or more of the system-created security futures contracts. Upon selection, a price negotiation between the investor and one or more dealers would take place across the system, as described in detail above. Once the price has been negotiated, the transaction involving the selected, system-created security futures contract can be completed. In this example, the system can be further configured to periodically create security futures contracts having expiration dates different from the available expirations dates for other security futures contracts related to the underlying security listed on a futures trading exchange based on a predefined criteria (e.g., hourly, daily, weekly, monthly, etc.) or based on particular market conditions (e.g., based on a determination that a security futures contract having a specific expiration date will result in a desired rate of return). Additionally, the system can be configured to periodically remove system-created security futures contracts from being listed on the futures trading exchange.

In an alternate embodiment of an EFP trade in accordance with the present invention, particularly in the case where the selected expiration date of the security futures contract is relatively short, the security futures contract with a selectable expiration date could expire but automatically roll to the next period based on the initial selected period until the investor terminates the transaction. In this embodiment, for example, the investor would enter an EFP trade that expires in a fixed, short period (e.g., 3-days). At the end of the 3 days, the contract would automatically roll into the next 3-day contract unless the investor terminates the transaction. In this way, the investor would get the rate of return for the period, but the interest rate would be reset for the next period every time the contract is rolled based on a new price quote for the security futures contract with a selectable expiration date.

While there have been shown and described fundamental novel features of the invention as applied to the exemplary embodiments thereof, it will be understood that omissions and substitutions and changes in the form and details of the disclosed invention may be made by those skilled in the art without departing from the spirit of the invention.

I claim:

1. A computer implemented method of creating a security futures contract for inclusion as part of an exchange for physicals trade, wherein a first counterparty computer is communicatively connected to a second counterparty computer via a computer network, the method comprising:

receiving a request message from the first counterparty computer at the second counterparty computer to create the security futures contract, the request message including a first indication of an underlying security for which the security futures contract will be associated, and a second indication of a selected expiration date for the security futures contract, wherein the selected expiration date is different than available expiration dates for other security futures contracts related to the underlying security as listed on a futures trading exchange;

automatically identifying one or more available exchange for physicals trades including the securities futures contract based on rate of return and selecting one of the available exchange for physicals trades;

receiving a request message from the first counterparty computer to execute one of the identified exchange for physicals trades including the security futures contract with the selected expiration date and a trade for the underlying security;

transmitting a quote message from the second counterparty computer to the first counterparty computer including at least a price quote for the security futures contract based on the first and second indications in the request message;

receiving an acceptance message from the first counterparty computer at the second counterparty computer indicating acceptance of the price quote;

facilitating creation of the security futures contract whereby the security futures contract based on the underlying security has an expiration date equal to the selected expiration date; and facilitating the exchange for physicals trade including the security futures contract.

2. The method of claim 1, wherein the facilitating creation step comprises causing the security futures contract to be listed on the futures trading exchange.

3. The method of claim 1, wherein a futures trading exchange system is communicatively connected to at least one of the first and second counterparty computers, and the facilitating creation step comprises:
 transmitting information related to the security futures contract to the futures trading exchange system, such that the futures trading exchange system lists the security futures contract.

4. The method of claim 1, wherein facilitating the exchange for physicals trade includes exchange of the security futures contract having the selected expiration date for the underlying security.

5. The method of claim 4, wherein a futures trading exchange system includes at least one computer and a related database capable of communication with at least one of the first counterparty computer and second counterparty computer and wherein the facilitating execution step comprises:
 transmitting a transaction request message to the futures trading exchange system including at least information indicative of the underlying security, the security futures contract with the selected expiration date, and one or more parameters for the exchange for physicals trade, whereby the exchange for physicals trade is executed by the futures trading exchange system.

6. A computer implemented method of causing an execution of an exchange for physicals trade involving a securities futures contract, wherein the futures contract includes a standardized set of specifications including at least an underlying asset and a number of units for the underlying asset for the futures contract, the method comprising:
 utilizing a computer to calculate rates of return for one or more available exchange for physicals trades including the securities futures contract, the contract further including a delivery date that is different than available delivery dates for other futures contracts related to the underlying asset listed on a futures trading exchange;
 utilizing the computer to automatically identify one or more of the available exchange for physicals trades including the securities futures contract based on the rates of return;
 selecting one of the available exchange for physicals trades;
 receiving a first request to execute an exchange for physicals trade involving the futures contract and the underlying asset;
 receiving a price quote related to a request to execute the exchange for physicals trade; and
 causing the execution of the exchange for physicals trade, wherein a first counterparty sells the futures contract to a second counterparty in exchange for the corresponding underlying asset.

7. The method of claim 6, wherein the underlying asset is a security.

8. The method of claim 7, wherein the security is selected from the group consisting of stocks, bonds, exchange traded funds, funds, and options.

9. The method of claim 6, wherein the underlying asset is a commodity.

10. The method of claim 9, wherein the commodity is selected from the group consisting of west texas intermediate crude, light, sweet crude, brent crude, natural gas, heating oil, gulf coast gasoline, propane, uranium, wheat, corn, soybeans, oats, rice, cocoa, coffee, cotton, sugar, hogs, pork bellies, cattle, gold, platinum, palladium, silver, copper, lead, zinc, tin, aluminum, nickel, steel, ethanol, and rubber.

11. A system for creating a security futures contract having a selectable expiration date for inclusion in an exchange for physicals trade including the security futures contract, the system comprising:
 a computer system including at least one computer and a related database, the computer system communicatively connected via a network to one or more counterparty computers and operative with a creation programming component to:
 cause the display of one or more user interfaces on the one or more counterparty computers, the user interfaces including input fields enabling entry of information relating to the security futures contract;
 receive a first selection for an underlying security to be bought or sold at a future date;
 receive a second selection for a contract amount;
 receive a third selection for an expiration date selected by a user of the one or more counterparty computers, wherein the selected expiration date is different than available expiration dates for other security futures contracts related to the underlying security as listed on a futures trading exchange;
 transmit a quote for the security futures contract based on the first, second, and third selections to the one or more counterparty computers;
 receive an acceptance message from the one or more counterparty computers; and
 facilitate creation of the security futures contract based on the first, second, and third selections and using the quote, the computer system being further programmed to (i) automatically identify one or more exchange for physicals trades including the securities futures contract based on the first, second, and third selections and (ii) calculate an implied rate of return (IRR) for the exchange for physicals trades that include the security futures contract, the IRR based on information transmitted to the computer system, and select one or more of the exchange for physicals trades including the securities futures contract based on the IRRs.

12. The system of claim 11, wherein the computer system is a futures trading exchange system, and the one or more counterparty computers include a first counterparty computer operated by an investor and a second counterparty computer operated by a broker-dealer.

13. The system of claim 11, wherein the computer system is operated by a broker-dealer.

14. The system of claim 13, wherein the computer system is further operative to communicate with a futures trading exchange system configured to receive information from the computer system relating to the security futures contract and list the security futures contract based on the information received from the computer system.

15. The system of claim 11, wherein a user interface provided at the one or more counterparty computers includes input fields permitting a user to input information relating to the security futures contract and wherein the input fields include at least a selected expiration date, wherein the selected expiration date is different than available expiration dates for other security futures contracts related to the underlying security as listed on a futures trading exchange.

16. The system of claim 11, wherein the computer system is programmed to dynamically calculate and cause the one or more counterparty computers to display an implied rate of return for a set of exchange for physicals trades related to the security futures contract.

17. The system of claim 11, wherein the computer system further comprises a pricing component programmatically operative to:
receive investor-selected criteria, including at least an investor-selected expiration date, for an exchange for physicals trade including at least an investment criteria;
search pricing data available to the computer system for available security futures contracts; and
display any matches based on the criteria and the pricing data available to the computer system for available security futures contracts wherein, for each match, the pricing component calculates an implied rate of return for the exchange for physicals trade.

18. The system of claim 17, wherein the computer system is further programmed to calculate and display a comparison of the implied rate of return for the exchange for physicals trade to the rate of return that the investor would receive from a broker on the same free funds if not used in the exchange for physicals trade.

19. A system for identifying and selecting one or more exchange for physicals trades, the system comprising:
one or more computers programmed with a pricing component operative to:
receive investor selected criteria, the investor selected criteria including a rate of return;
search data available to the system for available security futures contracts; and
automatically identify and select one or more exchange for physicals trades including the securities futures contract based on the rate of return included in the investor selected criteria and the data available to the system for available security futures contracts, wherein at least one exchange for physicals trade being identified and selected includes a security futures contract having a selected expiration date that is different than available expiration dates for other security futures contracts listed on a futures trading exchange.

20. The system of claim 19, wherein the investor-selected criteria is a selected expiration date.

21. The system of claim 19, wherein the investor-selected criteria is an available amount of cash in an investor account.

22. The system of claim 19, wherein the investor-selected criteria is an underlying symbol for a security.

23. The system of claim 19, wherein the pricing component further comprises programming operative to search for and calculate one or more of the lowest rates of return available based on data available to the system for available security futures contracts.

24. The system of claim 19, wherein the pricing component further comprises programming operative to search for and calculate one or more of the highest rates of return available based on data available to the system for available security futures contracts.

25. A computer implemented method of facilitating an exchange for physicals trade including a security futures contract related to an underlying security, wherein a first counterparty computer is communicatively connected to a second counterparty computer via a network, the method comprising:
automatically identifying and selecting one or more exchange for physicals trades including the securities futures contract based on a desired rate of return or greater for the exchange for physicals trade, each security futures contract having a specific expiration date, wherein the specific expiration dates are different from the available expirations dates for other security futures contracts related to the underlying security listed on a futures trading exchange;
causing the plurality of security futures contracts to be displayed at the first counterparty computer;
receiving a request message to execute the exchange for physicals trade from the first counterparty computer, the exchange for physicals trade including one of the identified securities futures contracts; and
using a computer to facilitate execution of the exchange for physicals trade.

26. The method of claim 25, wherein the selection of the at least one security futures contract is transmitted to at least the second counterparty computer.

27. The method of claim 26, wherein the selection is transmitting from the first counterparty computer through a centralized system and then to the second counterparty computer.

28. The method of claim 27, wherein the centralized system is an exchange.

29. The method of claim 28, further comprising effecting the exchange for physicals trade involving the selected security futures contract at the accepted price quote.

30. The method of claim 25, wherein the plurality of security futures contracts are generated on a rotating basis, wherein at least a portion of the plurality of security futures contracts are replaced by newly generated security futures contracts.

31. A system for facilitating an exchange for physicals transaction including a security futures contract, comprising:
a computer system including at least one computer and a related database, the computer system communicatively connected via a network to one or more counterparty computers and operative with a programming component to:
generate a plurality of security futures contracts each having an expiration date, wherein the expiration date of at least one of the securities futures contracts is different from the available expirations dates for other security futures contracts related to the underlying security listed on a futures trading exchange;
cause the plurality of security futures contracts to be displayed on a first of the counterparty computers;
receive a request message from the first counterparty computer to execute an exchange for physicals trade related to one or more selected security futures contracts;
automatically identifying one or more available exchange for physicals trades including the securities futures contract based on rate of return and selecting one of the available exchange for physicals trades;
cause a price quote for the selected security futures contract of the identified exchange for physicals trades to be displayed on the first counterparty computer;
receive an acceptance message from the first counterparty computer indicating acceptance of the price quote; and
effect the exchange for physicals trade involving the selected security futures contract at the accepted price quote.

32. The system of claim 31, wherein the security futures contracts each have a unique expiration date.

33. The system of claim 31, wherein the database is configured to store for the security futures contracts an indication of the expiration date, an indication of the underlying security, and an indication of the price quote, wherein at least one of the computers is further operative to store in the database the indication of the expiration date, the indication of the underlying security, and the indication of the price quote.

34. The system of claim 33 wherein the computer system is further operative to cause the at least one preferred exchange for physicals trade to be displayed by the one or more counterparty computers.

35. The system of claim 11 wherein the at least one preferred exchange for physicals trade has a higher IRR than other exchange for physicals trades.

36. The system of claim 11 wherein the at least one preferred exchange for physicals trade has a lower IRR than other exchange for physicals trades.

37. A non-transient computer readable medium containing program instructions to select at least one exchange for physicals trade including a security futures contract having a selectable expiration date, the program instructions operative for causing a computer system including one or more computers to:

cause the display of one or more user interfaces on one or more counterparty computers in communication with the computer system, the user interfaces including input fields enabling entry of information relating to the security futures contract;

receive a first selection for an underlying security to be bought or sold at a future date;

receive a second selection for a contract amount;

receive a third selection for an expiration date selected by a user of the one or more counterparty computers, wherein the selected expiration date is different than available expiration dates for other security futures contracts related to the underlying security as listed on a futures trading exchange;

transmit a quote for the security futures contract based on the first, second, and third selections to the one or more counterparty computers;

receive an acceptance message from the one or more counterparty computers;

facilitate creation of the security futures contract based on the first, second, and third selections and using the quote;

calculate an implied rate of return (IRR) for each of at least one exchange for physicals trades that includes the security futures contract, the IRR based on information transmitted to the computer system; and automatically identify and select at least one preferred exchange for physicals trade including the securities futures contract based on the IRR.

38. The method of claim 25 wherein the computer used to facilitate the exchange for physicals trade is the first counterparty computer.

39. The method of claim 25 wherein the computer used to facilitate the exchange for physicals trade is the second counterparty computer.

40. The method of claim 25 wherein the computer used to facilitate the exchange for physicals trade is a computer in a centralized system.

* * * * *